United States Patent
Adams et al.

(10) Patent No.: US 9,154,524 B2
(45) Date of Patent: *Oct. 6, 2015

(54) SYSTEM AND METHOD FOR EXCHANGING CRYPTOGRAPHIC PROTOCOL CAPABILITIES

(71) Applicant: BlackBerry Limited, Waterloo (CA)

(72) Inventors: Neil Patrick Adams, Waterloo (CA); Michael Stephen Brown, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 51 days.

This patent is subject to a terminal disclaimer.

(21) Appl. No.: 14/041,509

(22) Filed: Sep. 30, 2013

(65) Prior Publication Data
US 2014/0215205 A1    Jul. 31, 2014

Related U.S. Application Data

(63) Continuation of application No. 12/755,157, filed on Apr. 6, 2010, now Pat. No. 8,560,830.

(51) Int. Cl.
*H04L 29/06*    (2006.01)

(52) U.S. Cl.
CPC .......... *H04L 63/205* (2013.01); *H04L 63/0428* (2013.01)

(58) Field of Classification Search
None
See application file for complete search history.

(56) References Cited

U.S. PATENT DOCUMENTS 6,976,176 B1    12/2005    Schier
(Continued)

FOREIGN PATENT DOCUMENTS

EP    2117248 A1    11/2009

OTHER PUBLICATIONS

Adams, C.; "Use of the CAST-128 Encryption Algorithm in CMS"; Oct. 2000; RFC 2984.
(Continued)

*Primary Examiner* — Benjamin Lanier
(74) *Attorney, Agent, or Firm* — Jose Gutman; Fleit Gibbons Gutman Bongini & Bianco P.L.

(57) ABSTRACT

In some data communication configurations, data received from a sender may need to be viewed or otherwise processed by more than one entity with a corresponding client. For example, a message sent to a corporate email address may be viewed by either or both a mobile device and a desktop device. For the sender to utilize the strongest algorithm or protocol used by the recipient, it would therefore need to know which algorithms or protocols are supported by both the mobile and desktop mail clients. A system and method are provided to enable the mobile device to know about the capabilities of related mail clients associated with the communication address (e.g. email address) and vice versa such that the intersection of the capabilities (i.e. the strongest algorithm or protocol supported by all parties involved) can be chosen and the messages or data cryptographically processed accordingly.

18 Claims, 13 Drawing Sheets

(56) References Cited

U.S. PATENT DOCUMENTS

| | | |
|---|---|---|
| 7,231,517 B1 | 6/2007 | Mashayekhi |
| 7,362,866 B2 | 4/2008 | Zheng |
| 2003/0115332 A1 | 6/2003 | Honeisen |
| 2005/0160292 A1 | 7/2005 | Batthish et al. |
| 2005/0198490 A1 | 9/2005 | Jaganathan et al. |
| 2008/0172494 A1 | 7/2008 | Kim et al. |
| 2008/0201748 A1 | 8/2008 | Hasek et al. |

OTHER PUBLICATIONS

Ramsdell, B. (Ed.); "Secure/Multipurpose Internet Mail Extensions (S/MIME) Version 3.1 Message Specification"; Jul. 2004; RFC 3851.
Duss, S. et al.; "S/MIME Version 2 Message Specification"; Mar. 1998; RFC 2311.
S/MIME; http://wikipedia.org/wiki/S/MIME; Accessed Jan. 18, 2010.
MIME; http://wikipedia.org/wiki/MIME; Accessed Jan. 19, 2010.
Horn, Marc-Philipp; Search Report from corresponding European Application No. 10159173.3; search completed Sep. 24, 2010.

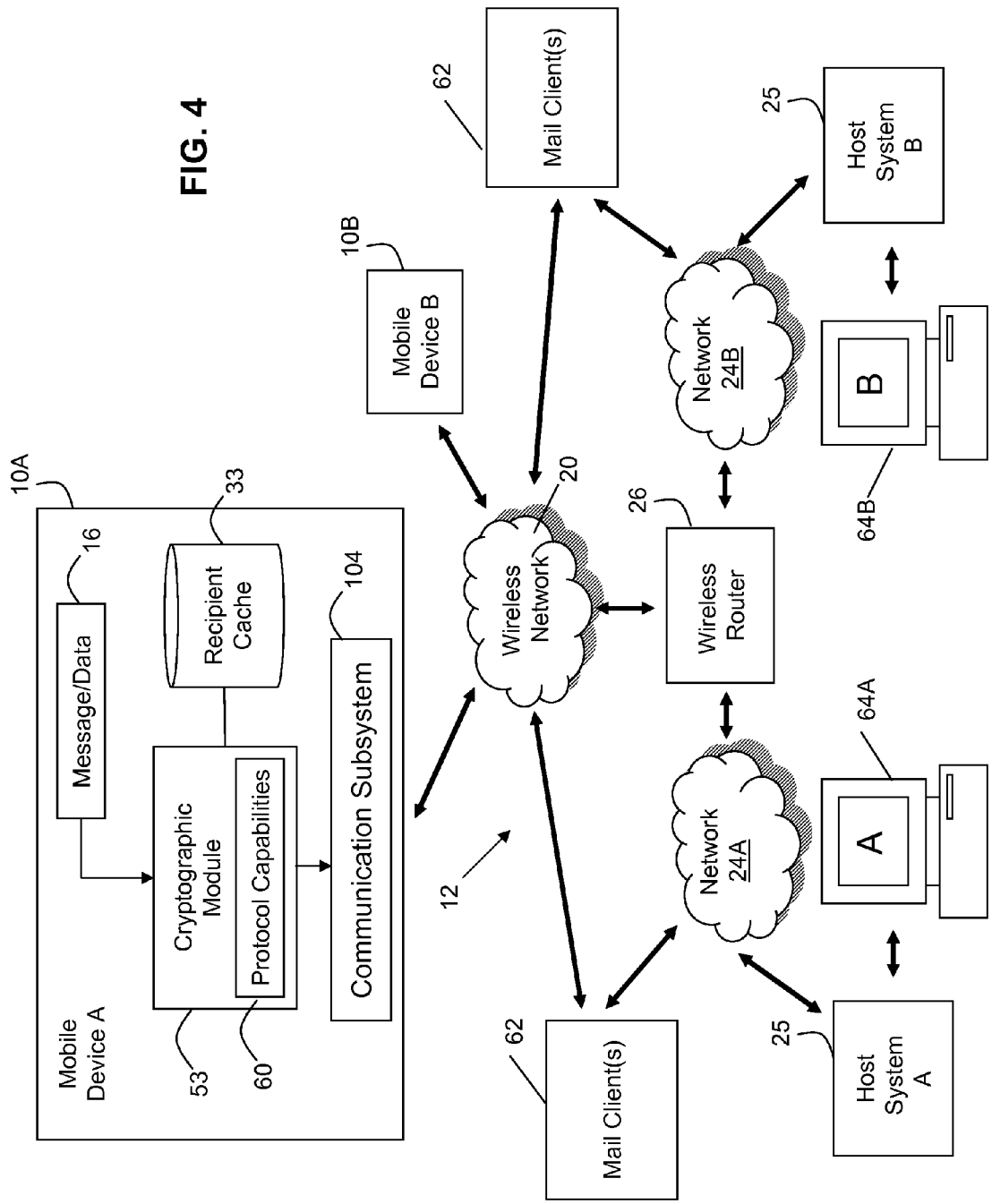

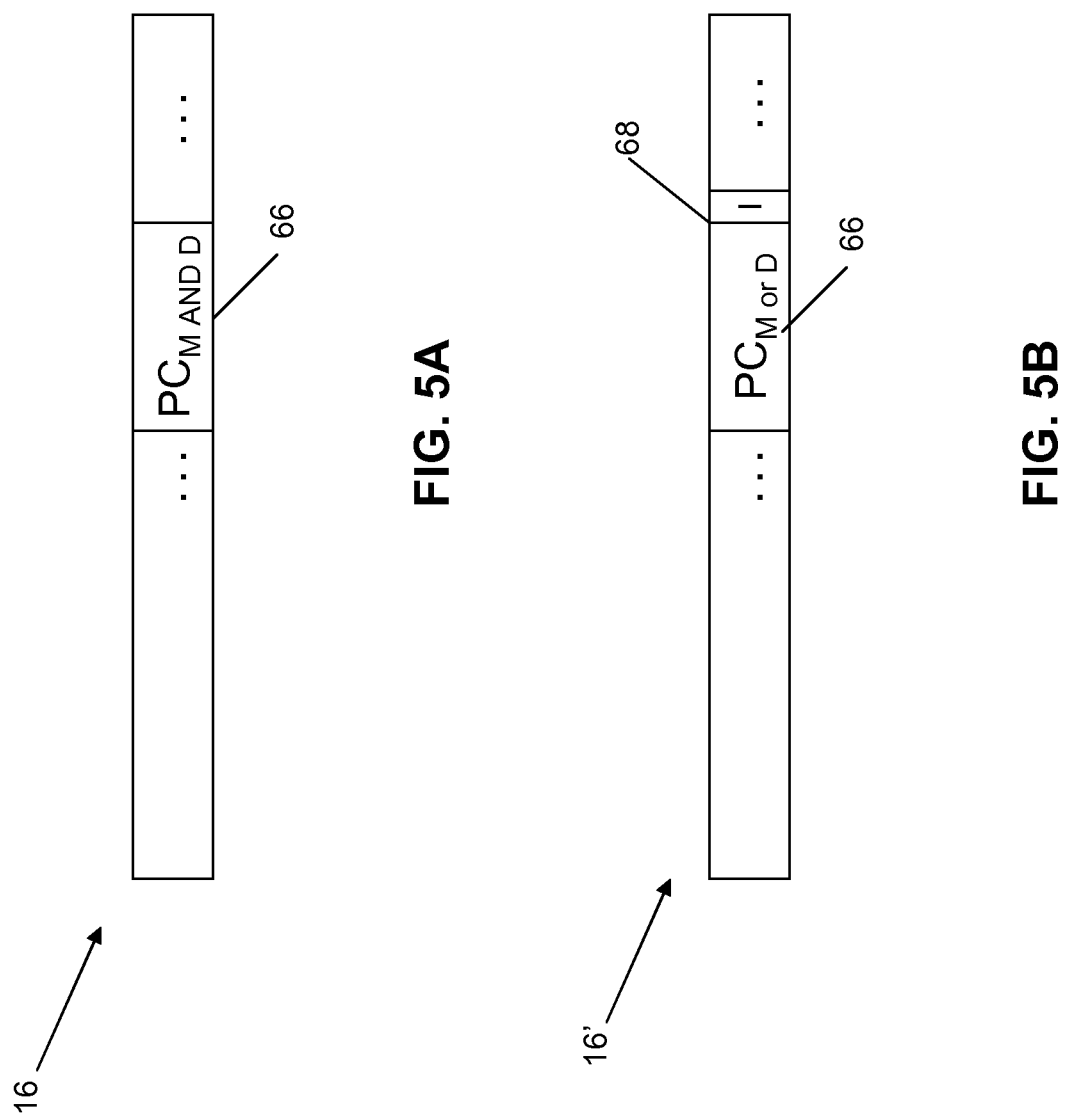

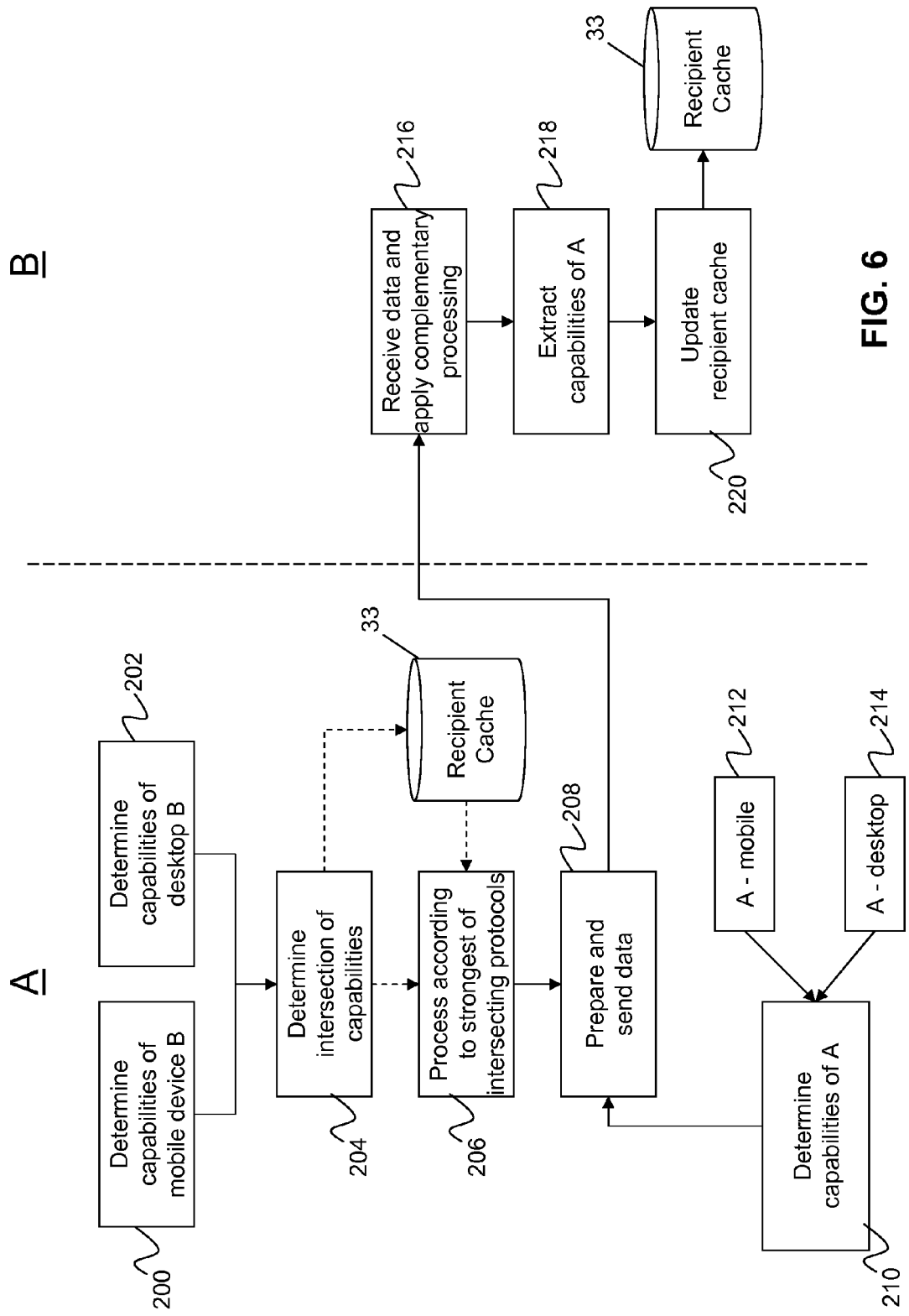

SYSTEM AND METHOD FOR EXCHANGING CRYPTOGRAPHIC PROTOCOL CAPABILITIES

CROSS-REFERENCED TO RELATED APPLICATIONS

The present application is a continuation of U.S. patent application Ser. No. 12/755,157 filed on Apr. 6, 2010 incorporated herein by reference.

TECHNICAL FIELD

The following relates to systems and methods for exchanging cryptographic protocol capabilities.

BACKGROUND

When exchanging messages between computing devices such as mobile devices or desktop computers, often the messages being exchanged are cryptographically processed prior to being transmitted, and complementary processing applied upon receipt. For example, it is well known to encrypt a message using a symmetric key. The cryptographic processing being used often needs to have consideration for the cryptographic protocols/algorithms supported not only by the sender, but also any recipients. In some cases, numerous cryptographic protocols are available to be used and the sender typically chooses the cryptographically "strongest" protocol that would be supported by both sender and receiver. An example of such a scheme is the Secure/Multipurpose Internet Mail Extension (S/MIME) scheme, which is a well known standard for public key encryption and signing of email encapsulated in MIME.

In schemes such as S/MIME, when sending a message to a recipient that the sender has not communicated with before, a default algorithm required to be supported by all recipients is typically used, e.g. RC2 or 3DES. Some mail clients that use S/MIME send their S/MIME capabilities with their messages, which includes an indication of which algorithms or protocols are supported by that client. This enables the recipient to use this information to send further messages accordingly.

BRIEF DESCRIPTION OF THE DRAWINGS

Embodiments will now be described by way of example only with reference to the appended drawings wherein:

FIG. 4 is block diagram of an example configuration for exchanging cryptographic protocol capabilities using the cryptographic module shown in FIG. 3.

FIG. 5A is a schematic diagram showing an example representation of data, a portion of which provides an indication of protocol capabilities for both mobile and other mail clients.

FIG. 5B is a schematic diagram showing an example representation of data, a portion of which provides an indication of protocol capabilities and an identifier indicative of the corresponding mail client.

FIG. 6 is a flow diagram illustrating example computer executable instructions for exchanging information pertaining to cryptographic protocol capabilities.

DETAILED DESCRIPTION OF THE DRAWINGS

In some data communication configurations such as for email, a message or data received from a sender may need to be viewed or otherwise processed by more than one entity with a corresponding mail client. For example, a message sent to a corporate email address may be viewed by either or both a mobile device and a desktop device. For the sender to utilize the strongest algorithm or protocol used by the recipient, it would therefore need to know which algorithms or protocols are supported by both the mobile and desktop mail clients. However, when sending a message from either entity, often only the local capabilities are known and thus the capabilities may not be included in the message to prevent future messages received from that recipient from not being viewable. In protocols such as S/MIME, this would cause only the default algorithms or protocols to be used when the device is in fact often capable of using stronger algorithms.

It has been recognized that in order to address this problem, the mobile device should know about the capabilities of related mail clients associated with the communication address (e.g. email address) and vice versa. In this way, the intersection of the capabilities (i.e. the strongest algorithm or protocol supported by all parties involved) can be chosen and the messages or data cryptographically processed accordingly. For ease of explanation, cryptographic algorithms, routines, schemes, protocols or other collection of steps or operations will collectively be referred to as cryptographic protocols.

The following examples include communications between mobile or handheld devices, which will be commonly referred to as mobile devices hereinafter and referred to by numeral 10. As will be discussed, the principles discussed below are equally applicable to other computing devices.

The mobile device 10 can be a multi-way communication device with advanced data communication capabilities including the capability to communicate with other mobile devices 10 or computer systems through a network of transceiver stations. The mobile device 10 may also have the capability to allow voice communication. Depending on the functionality provided by the mobile device 10, it may be referred to as a data messaging device, a multi-way pager, a cellular telephone with data messaging capabilities, a wireless Internet appliance, or a data communication device (with or without telephony capabilities). The mobile device 10 can also be one that is used in a system that is configured for continuously routing all forms of pushed information from a host system 25 to the mobile device 10. One example of such a system will now be described making reference to FIG. 1.

Figure 1:
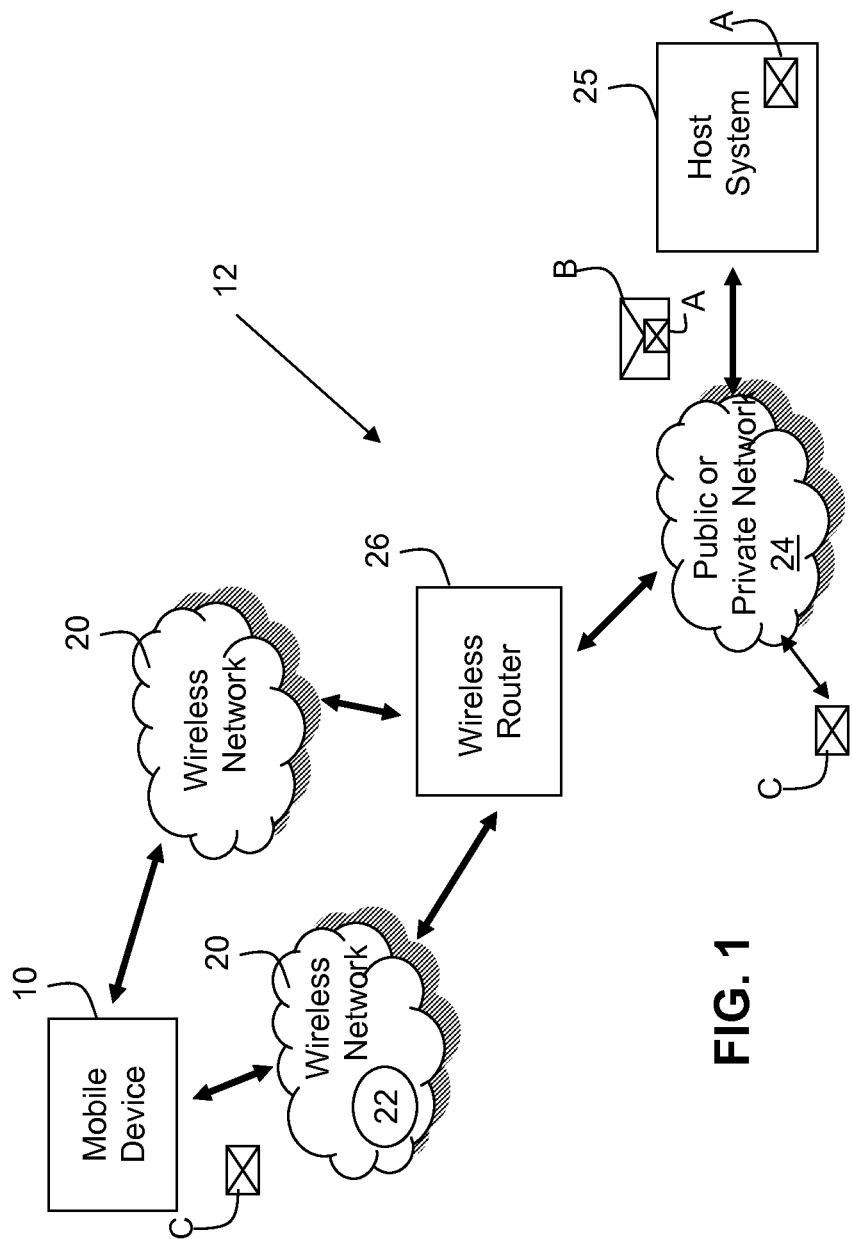
FIG. 1 is a schematic diagram illustrating a system in which data items are pushed from a host system to a mobile device.

FIG. 1 is an example system diagram showing the redirection of user data items (such as message A or C) from an intermediary computer system (host system) 25 to the user's mobile device 10 via a wireless router 26. The wireless router 26 provides the wireless connectivity functionality as it acts to both make transparent most of the wireless network's 20 complexities, and it also implements features necessary to support pushing data to the mobile device 10. Although not shown, a plurality of mobile devices may access data from the host system 25. In this example, message A in FIG. 1 represents an internal message sent from, e.g. a desktop computer (not shown) within the host system 25, to any number of server computers in the network (e.g. LAN), which may, in general, include a database server, an event server, an E-mail server or a voice-mail server.

Message C in FIG. 1 represents an external message from a sender that is not directly connected to the host system 25, such as the user's mobile device 10, some other user's mobile device (not shown), or any user connected to the public or private network 24 (e.g. the Internet). Message C could be e-mail, voice-mail, event information, database updates, web-page updates or could even represent a command message from the user's mobile device 10 to the host system 25. The host system 25 may comprise, along with the typical communication links, hardware and software associated with a computer network system, one or more wireless mobility agents, a TCP/IP connection, a collection of data stores, (for example a data store for e-mail could be an off-the-shelf mail server like Microsoft Exchange® Server or Lotus Notes® Server), all within and behind a network firewall.

The mobile device 10 may be adapted for communication within wireless network 20 via wireless links, as required by each wireless network 20 being used. As an illustrative example of the operation for a wireless router 26 shown in FIG. 1, consider a data item A, repackaged in outer envelope B (the packaged data item A now referred to as "data item (A)") and sent to the mobile device 10 from an Application Service Provider (ASP) in the host system 25. Within the ASP is a computer program, similar to a wireless mobility agent, running on any computer in the ASP's environment that is sending requested data items from a data store to a mobile device 10. The mobile-destined data item (A) is routed through the network 24, and through the wireless router's 26 firewall protecting the wireless router 26 (not shown).

Although the above describes the host system 25 as being used within a networked environment, this is just one embodiment of one type of host service that offers push-based messages for a handheld wireless device that is capable of notifying and presenting the data to the user in real-time at the mobile device when data arrives at the host system.

By offering a wireless router 26 (sometimes referred to as a "relay", "message server", "data redirector", etc.), there are a number of major advantages to both the host system 25 and the wireless network 20. The host system 25 in general runs a host service that is considered to be any computer program that is running on one or more computer systems. The host service is said to be running on a host system 25, and one host system 25 can support any number of host services. A host service may or may not be aware of the fact that information is being channelled to mobile devices 10. For example an e-mail or message program 138 (see FIG. 2) might be receiving and processing e-mail while an associated program (e.g. an e-mail wireless mobility agent) is also monitoring the mailbox for the user and forwarding or pushing the same e-mail to a wireless device 10. A host service might also be modified to prepared and exchange information with mobile devices 10 via the wireless router 26, like customer relationship management software. In a third example, there might be a common access to a range of host services. For example a mobility agent might offer a Wireless Access Protocol (WAP) connection to several databases.

Although the system is exemplified as operating in a multi-way communications mode, certain aspects of the system could be used in a "one and one-half" or acknowledgment paging environment, or even with a one-way paging system. In such limited data messaging environments, the wireless router 26 still could abstract the mobile device 10 and wireless network 20, offer push services to standard web-based server systems and allow a host service in a host system 25 to reach the mobile device 10 in many countries.

The host system 25 shown herein can have many methods when establishing a communication link to the wireless router 26. For one skilled in the art of data communications the host system 25 could use connection protocols like TCP/IP, X.25, Frame Relay, ISDN, ATM or many other protocols to establish a point-to-point connection. Over this connection there are several tunnelling methods available to package and send the data, some of these include: HTTP/HTML, HTTP/XML, HTTP/Proprietary, FTP, SMTP or some other proprietary data exchange protocol. The type of host systems 25 that might employ the wireless router 26 to perform push could include: field service applications, e-mail services, stock quote services, banking services, stock trading services, field sales applications, advertising messages and many others. This wireless network 20 abstraction is made possible by the wireless router 26, which implements this routing and push functionality. The type of user-selected data items being exchanged by the host could include: E-mail messages, events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 25, or that the host system 25 acquires through the use of intelligent agents, such as data that is received after the host system 25 initiates a search of a database or a website or a bulletin board.

The wireless router 26 provides a range of services to make creating a push-based host service possible. These networks may comprise: (1) the Code Division Multiple Access (CDMA) network, (2) the Groupe Special Mobile or the Global System for Mobile Communications (GSM) and the General Packet Radio Service (GPRS), and (3) the existing and upcoming third-generation (3G) and fourth generation (4G) networks like EDGE, UMTS and HSDPA, LTE, Wi-Max etc. Some older examples of data-centric networks include, but are not limited to: (1) the Mobitex Radio Network ("Mobitex") and (2) the DataTAC Radio Network ("DataTAC").

To be effective in providing push services for host systems 25, the wireless router 26 may implement a set of defined functions. It can be appreciated that one could select many different hardware configurations for the wireless router 26, however, many of the same or similar set of features would likely be present in the different configurations. The wireless router 26 may offer any one or more of the following features for host services: 1) An addressing method so that mobile device 10 traffic can be addressed to a host system 25 without the need for the wireless network 20 to assign an identity to each host system 25; 2) An efficient and authenticated method for the host system 25 to initiate a communication connection to the wireless router 26 for the purposes of opening a communication tunnel to the one or more mobile devices 10 that the host system 25 wishes to communicate with; 3) A reliable method for exchanging data between the host system 25 and the mobile device 10, in a manner consistent with the abilities of the wireless network 20; 4) Providing feedback to the host system 25 when data is delivered, which allows the host system to clean up any wireless delivery queues if necessary, or inform the original sender (user or program) that the data has been delivered to the mobile device 10; 5) Implementation of a wireless network 20 initiated push of services or data to a mobile device 10, from a wireless router 26; and 6) Connect to a wide range of wireless networks 20 and provide a way of tracking the user's location so that a 'follow you anywhere' solution can be provided.

Figure 2:
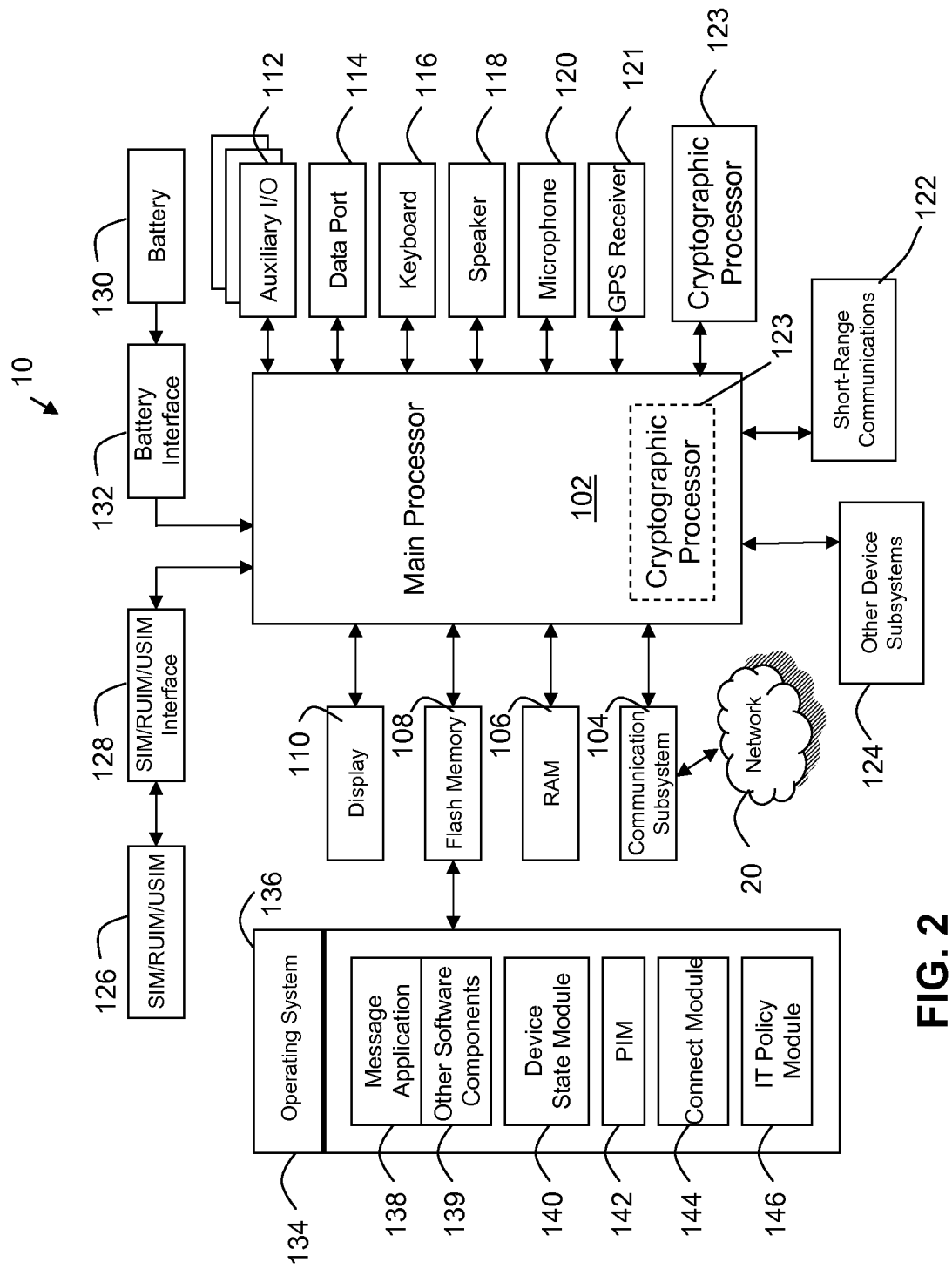
FIG. 2 is a block diagram of an example embodiment of a mobile device.
Figure 3:
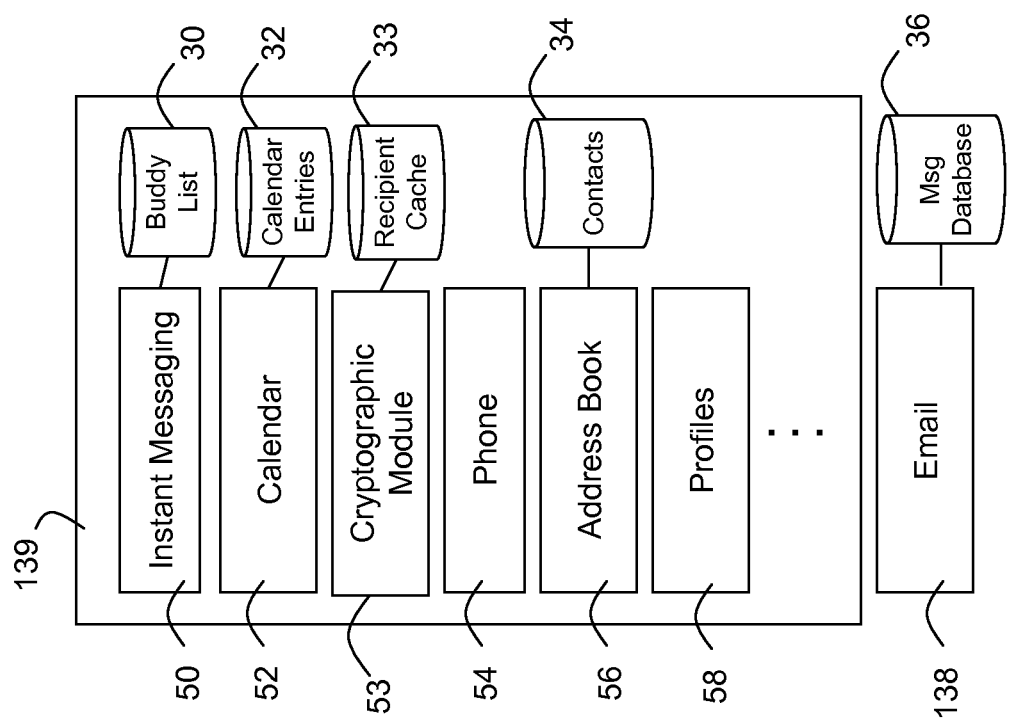
FIG. 3 is a block diagram illustrating example ones of the other software applications and components shown in FIG. 2.

An example configuration for the mobile device 10 is illustrated in FIGS. 2-3. Referring first to FIG. 2, shown therein is a block diagram of an example embodiment of a mobile device 10. The mobile device 10 comprises a number of components such as a main processor 102 that controls the overall operation of the mobile device 10. Communication functions, including data and voice communications, are performed through a communication subsystem 104. The communication subsystem 104 receives messages from and sends messages to a wireless network 20. In this example embodiment of the mobile device 10, the communication subsystem 104 is configured in accordance with the GSM and GPRS standards, which are used worldwide. Other communication configurations that are equally applicable are the 3G and 4G networks discussed above. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 20 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124. As will be discussed below, the short-range communications 122 can implement any suitable or desirable device-to-device or peer-to-peer communications protocol capable of communicating at a relatively short range, e.g. directly from one device to another. Examples include Bluetooth®, ad-hoc WiFi, infrared, or any "long-range" protocol re-configured to utilize available short-range components. It will therefore be appreciated that short-range communications 122 may represent any hardware, software or combination of both that enable a communication protocol to be implemented between devices or entities in a short range scenario, such protocol being standard or proprietary.

Some of the subsystems of the mobile device 10 perform communication-related functions, whereas other subsystems may provide "resident" or on-device functions. By way of example, the display 110 and the keyboard 116 may be used for both communication-related functions, such as entering a text message for transmission over the network 20, and device-resident functions such as a calculator or task list.

The mobile device 10 can send and receive communication signals over the wireless network 20 after required network registration or activation procedures have been completed. Network access is associated with a subscriber or user of the mobile device 10. To identify a subscriber, the mobile device 10 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 10 is not fully operational for communication with the wireless network 20. Once the SIM/RUIM/USIM 126 is inserted into the SIM/RUIM/USIM interface 128, it is coupled to the main processor 102.

The mobile device 10 is typically a battery-powered device and in this example includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 10. Although current technology makes use of a battery, future technologies such as micro fuel cells may provide the power to the mobile device 10.

In the examples described herein, the mobile device 10 comprises or otherwise has access to a cryptographic processor 123 which can be embodied in hardware, software, or a combination of the two. Also, as will be discussed below, the cryptographic processor 123 may control or include a cryptographic module 53 which may represent an cryptographic or security related application that cryptographically processes data. The mobile device 10 may also comprise internal or external memory or other computer readable media for storing computer executable instructions for enabling the cryptographic processor 123 to perform cryptographic operations as is known in the art. As can be seen in FIG. 2, the cryptographic processor 123 may be independent of the main processor 102 in a mobile device configuration, or may be implemented by special instructions or hardware associated with the main processor 102 itself.

The mobile device 10 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Software applications may include a message application 138, a device state module 140, a Personal Information Manager (PIM) 142, a connect module 144 and an IT policy module 146. A message application 138 can be any suitable software program that allows a user of the mobile device 10 to send and receive electronic messages, wherein messages are typically stored in the flash memory 108 of the mobile device 10. A device state module 140 provides persistence, i.e. the device state module 140 ensures that important device data is stored in persistent memory, such as the flash memory 108, so that the data is not lost when the mobile device 10 is turned off or loses power. A PIM 142 includes functionality for organizing and controlling data items of interest to the user, such as, but not limited to, e-mail, text messages, instant messages, contacts, events, and voice mails, and may interact with the wireless network 20. A connect module 144 implements the communication protocols that are required for the mobile device 10 to communicate with the wireless infrastructure and any host system 25, such as an enterprise system, that the mobile device 10 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 10. These software applications 139 can be pre-installed applications (i.e. other than message application 138) or third party applications, which are added after the manufacture of the mobile device 10. Examples of third party applications include games, calculators, utilities, etc. The additional applications 139 can be loaded onto the mobile device 10 through at least one of the wireless network 20, the auxiliary I/O subsystem 112, the data port 114, the short-range communications subsystem 122, or any other suitable device subsystem 124.

The data port 114 can be any suitable port that enables data communication between the mobile device 10 and another computing device. The data port 114 can be a serial or a parallel port. In some instances, the data port 114 can be a USB port that includes data lines for data transfer and a supply line that can provide a charging current to charge the battery 130 of the mobile device 10.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

For composing data items, such as e-mail messages, for example, a user or subscriber could use a touch-sensitive overlay (not shown) on the display 110 that is part of a touch screen display (not shown), in addition to possibly the auxiliary I/O subsystem 112. The auxiliary I/O subsystem 112 may include devices such as: a mouse, track ball, infrared fingerprint detector, or a roller wheel with dynamic button pressing capability. A composed item may be transmitted over the wireless network 20 through the communication subsystem 104.

FIG. 3 shows an example of the other software applications and components 139 that may be stored on and used with the mobile device 10. Only examples are shown in FIG. 3 and such examples are not to be considered exhaustive. In this example, an instant messaging application 50, calendar application 52 (or other event related organizer), a cryptographic module 53, phone application 54, address book 56 and a profiles application 58 are shown to illustrate the various features that may be provided by the mobile device 10. Also shown in FIG. 3 is the message application 138, which in the following will be referred to as an email application 138 for clarity and stores or otherwise has access to a message database 36 for storing incoming and outgoing messages as well as those stored in various folders. It will be appreciated that the various applications may operate independently or may utilize features of other applications. For example, the phone application 54 and email application 138 may use the address book 56 for contact details obtained from a list of contacts 34.

The instant messaging application 50 is an instant messaging service that may hosted and provided by the host system 25, e.g. using a messaging server at the wireless router 26 or may be associated with a $3^{rd}$ party instant messaging service (not shown). The instant messaging application 50 comprises or otherwise has access to contact information often referred to as a "buddy" list 30. The calendar application 52 comprises or otherwise has access to a portion of memory, database or other data storage device storing calendar entries 32, which may include any data or information associated with a particular date and time in the calendar application 52 and may be displayed in a graphical user interface (GUI) therefor.

The cryptographic module 53 comprises or otherwise has access to a portion of memory, database or other data storage device providing a recipient cache 33, which may include any data or information associated with the cryptographic capabilities of various recipient devices or entities. For example, as provided by way of example below, the recipient cache 33 can be used to stored the protocol capabilities that are supported by both mobile devices 10 and other computing devices (e.g. desktop computer) for such recipients.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, wireless router 26, host system 25, etc., or accessible or connectable thereto. Any application or module herein described may be implemented using computer readable/executable instructions that may be stored or otherwise held by such computer readable media.

Turning now to FIG. 4, an example configuration for exchanging cryptographic protocol capabilities using the cryptographic module 53 is shown. In this example, two correspondents A and B and their respective mobile devices 10A, 10B and desktop computers 64A and 64B are shown. As discussed above, each mobile device 10A, 10B may be configured to communicate through a network infrastructure 12 such as that shown in FIG. 1. In such a configuration, each mobile device 10A, 10B may connect to one or more wireless networks 20 and, in this case, each public or private network 24A, 24B serving the desktop computers 64A, 64B, is connected to the wireless network 20 via the wireless router 26. In this way, data such as email messages sent to or from either entity (A or B) can be viewed using the respective mobile device 10A, 10B and the respective desktop computer 64A, 64B, using associated mail clients 62. In this example, the mail clients 62 may be web based, however, it will be appreciated that they may be enterprise based or a combination of both configurations (e.g. available via the host system 25 and via a web-based mail portal (not shown)). It can be appreciated that the configuration shown in FIG. 4 is purely for illustrative purposes and various other configurations in which one or more related entities associated with the correspondent (e.g. the mobile device 10) may apply.

Details of an example configuration for mobile device 10A are shown, however, it will be appreciated that a similar configuration may also apply to mobile device 10B. Also, similar capabilities would be provided by the desktop computers 64A, 64B as would be appreciated by those skilled in the art. In the example shown, the mobile device 10A is configured to cryptographically process data 16 such as a message (e.g. email message), using the cryptographic module 53. When available, the cryptographic module 53 can reference cryptographic protocol capabilities associated with the recipient correspondent that may be stored in the recipient cache 33. As discussed above, if the mobile device 10A has not yet received a communication from the recipient, they may not yet have any information pertaining to their cryptographic protocol capabilities and would thus utilize a default cryptographic protocol. For example, in S/MIME, if cryptographic capabilities of the recipient are not known when sending an email message to that recipient, the RC2 or 3DES protocols may be used. If however, the mobile device 10A has received information pertaining to the cryptographic protocol capabilities of the recipient, such information may be accessed from the recipient cache 33 and used to determine the strongest protocol supported by the recipient. In this example, since the recipient, correspondent B, has both a mobile device 10B and a desktop computer 64B associated with the recipient address, the recipient cache 33 should include either all capabilities of both entities, or the intersecting protocols for both entities (i.e. protocols supported by both entities).

In addition to utilizing information in the recipient cache 33 to determine which cryptographic protocol to use for processing the data 16, where applicable (e.g. when using S/MIME), the mobile device 10A may also include in the data 16 being sent, its own cryptographic capabilities by referencing a local protocol capabilities module 60. In this example, since correspondent A is associated with both mobile device 10A and desktop computer 64A, the protocol capabilities module 60 should be indicative of the capabilities of both entities. Similar to the information in the recipient cache 33, the protocol capabilities module 60 should include either all capabilities of both entities, or the intersecting protocols for both entities.

The data 16, once cryptographically processed by the cryptographic module 53, may then be transmitted over the wireless network 20 and associated network infrastructure 12 via the communication subsystem 104.

FIG. 5A illustrates an example data structure format for the data 16 handled by the cryptographic module 53. In this example, a portion of the data 16 is reserved for enabling the sending device to provide an indication of cryptographic protocol capabilities as determined from the protocol capabilities module 60 supported by the correspondent as a whole (e.g. for all related entities). In FIG. 5A, the protocol capabilities (PC) included in the data 16 are given reference numeral 66. The data structure in FIG. 5A assumes that the device sending the data 16 knows the capabilities of all entities associated with the correspondent, in this example the mail clients for both the mobile device 10 and the desktop computer 64. As such, it can be seen that the protocol capabilities 66 are related to the mobile entity (M) and the desktop entity (D)—with $PC_{M\,AND\,D}$ as a short-hand representation for brevity.

FIG. 5B illustrates another example data structure format for the data 16', wherein the suffix (') indicates data 16 that has been processed by the cryptographic module 53 but provides only its local capabilities. As can be seen in FIG. 5B, the data 16' comprises a portion reserved for providing an indication of protocol capabilities 66. However, in this example, either a portion of the space reserved for the protocol capabilities 66, or an additional portion of the data 16, is also reserved for including an identifier (I) 68 that is indicative of which mail client the protocol capabilities 66 correspond to, in this example either the mail client for the mobile device 10 or a mail client 62 for the desktop computer 64—represented in FIG. 5B as $PC_{M\,OR\,D}$ for brevity. It can be appreciated that typically the data $PC_{M\,OR\,D}$ is signed by the sender and is verified by the recipient before trusting the capabilities.

Turning now to FIG. 6, an example set of computer executable operations is shown for having a first correspondent A provide their cryptographic protocol capabilities 66 to another correspondent B and, if applicable, utilize knowledge of correspondent B's capabilities to process the data 16 being sent. It can be appreciated that the operations shown in FIG. 6 are applicable to any entity associated with the respective correspondents, including the mobile devices 10 and desktop computers 64 shown in FIG. 4. Continuing with the example shown in FIG. 4, at 200, the correspondent A determines the capabilities of mobile device 10B associated with correspondent B and at 202, the correspondent A determines the capabilities of desktop computer 64B. As will be shown in greater detail below, the capabilities with respect to correspondent B can be obtained in various ways, for example, by receiving one or more messages or data (not shown) and extracting the capabilities $PC_{M\,AND\,D}$ 66 or $PC_{M\,OR\,D}$ 68 (from each entity). The intersection of the capabilities for both entities may then be determined at 204 and the data 16 processed according to the strongest of the intersecting protocols at 206. As can be seen in FIG. 6, if the operations 200, 202 (and optionally 204) are performed as correspondent A receives a first communication from correspondent B (not shown), the recipient cache 33 can be updated at this time.

Once the strongest of the intersecting protocols associated with correspondent B, i.e. the strongest protocol supported by both the mobile device 10B and the desktop computer 64B, is determined and applied to the data 16 at 206, the data 16 is prepared and sent to correspondent B at 208. The preparation of the data 16 may include, for example in an S/MIME communication, the indication of protocol capabilities $PC_{M\,AND\,D}$ 66 for correspondent A, after first determining such capabilities at 210. The determination of the protocol capabilities for correspondent A in this example involves determining the protocol capabilities for all entities associated with correspondent A, e.g. the mobile device 10A and the desktop computer 64A. In this example, assuming the sending device being used in FIG. 6 is the mobile device 10A, the protocol capabilities module 60 stored locally on the mobile device 10A can be referenced at 212. As will be explained in greater detail below, the protocol capabilities corresponding to other entities such as the desktop computer 64A can be obtained in various ways at 214. The cryptographic protocol capabilities for the desktop computer 64A can be stored with the protocol capabilities module 60 or can be stored in a separate data storage allocation (not shown). Alternatively, as discussed below, the protocol capabilities for any other entity can be obtained "on-the-fly" from a third party, intermediate or intermediary server or other device, where available, or directly from the desktop computer 64A if the appropriate connection exists.

The data 16 sent at 208 is received by correspondent B and complementary cryptographic processing applied to the received data at 216. The cryptographic capabilities $PC_{M\ AND\ D}$ 66 that were added to the data 16 by correspondent A may then be extracted by correspondent B at 218, and the recipient cache 33 updated at 220. It can be appreciated that the operations performed by correspondent B in this example may be performed by either or both the mobile device 10B and the desktop computer 64B.

Figure 7A:
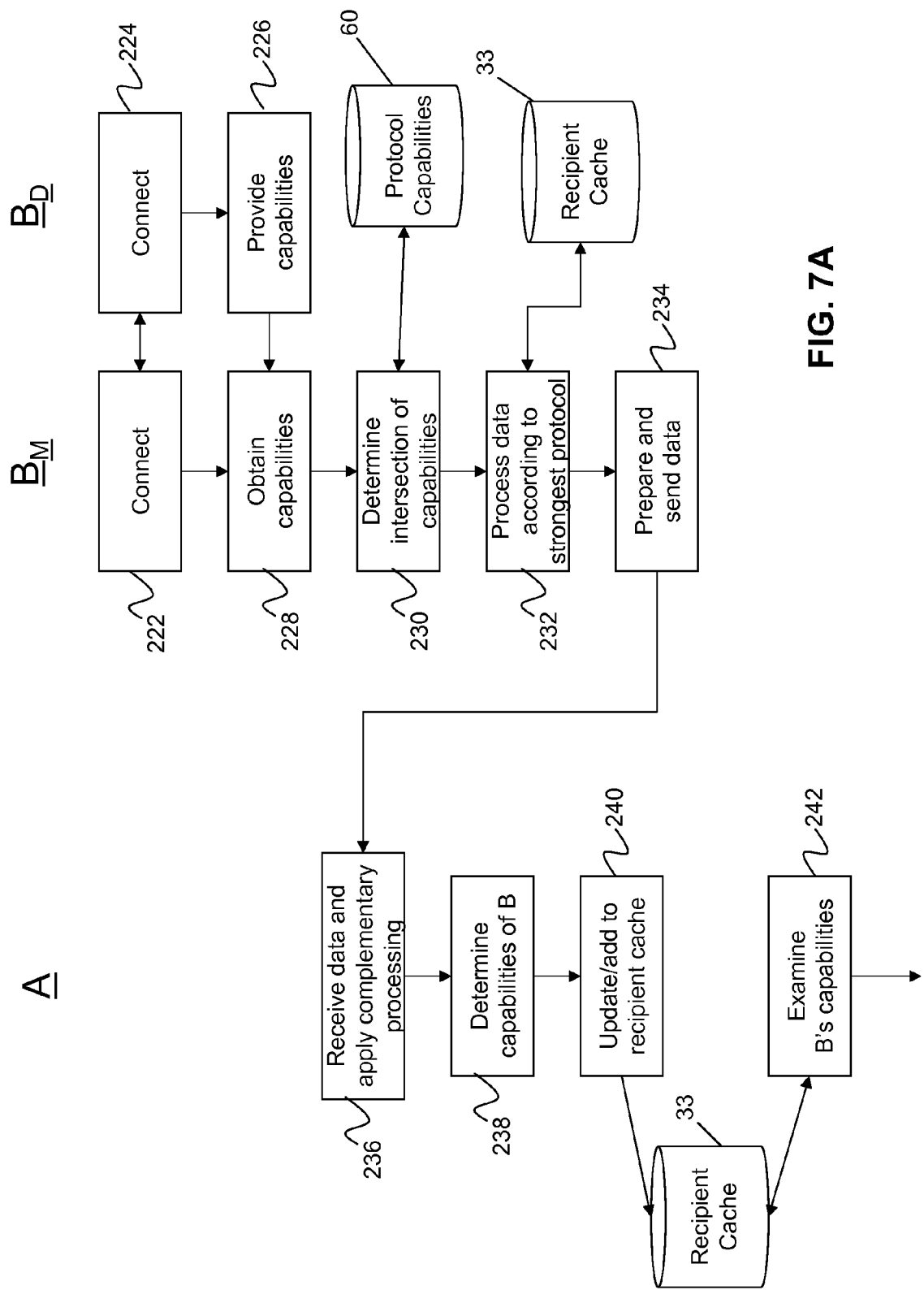
FIG. 7A is a flow diagram illustrating an example set of computer executable instructions for exchanging cryptographic protocol capabilities using the data structure shown in FIG. 5A.

FIG. 7A illustrates an example set of computer executable operations that may be performed by mobile device 10B in order to first obtain the cryptographic capabilities of the desktop computer 64B to include in a data transmission. At 222 and 224, a connection is established between the mobile device 10B and the desktop computer 64B. For example, the mobile device 10B may be "docked" or otherwise connected directly to the desktop computer 64B. In some embodiments, the connection established in 222 and 224 may be associated with another process such as a digital certificate synchronization. Via the connection thus established, the desktop computer 64B enables the provision of its capabilities at 226, and the mobile device 10B is then able to obtain an indication of such capabilities at 228. In this example, the cryptographic module 53 of the mobile device 10B determines the intersection of the capabilities of the mobile device 10B and the desktop computer 64B at 230 and this information included in the data 16, i.e. as $PC_{M\ AND\ D}$ 66 in this example. As shown in FIG. 7A, the intersecting protocol capabilities can also be used to update the protocol capabilities module 60 on the mobile device 10 for future communications.

At 232, the data 16, which at this time includes the information $PC_{M\ AND\ D}$ 66, is processed according to the strongest intersecting protocol supported by the entities associated with correspondent A at 232, e.g. by referencing the recipient cache 33. It can be appreciated that the example shown in FIG. 7A assumes that such information is already known to correspondent B, more particularly mobile device 10B. If mobile device 10B has not before received data 16 from correspondent A that includes this information or otherwise does not have access to such information, a default protocol may be used to process the data 16 at 232. The data 16 may then be prepared and sent to correspondent A at 234.

The correspondent A, i.e. the mobile device 10A, the desktop computer 64A or both in this example would then receive the data 16 and perform the complementary cryptographic processing (e.g. decrypting the data 16 using a symmetric key, verifying a signature on the data 16, etc.) at 236. The protocol capabilities $PC_{M\ AND\ D}$ 66 may then be extracted from the data 16 at 238, and the recipient cache 33 updated or a new entry associated with correspondent B added to the recipient cache 33 at 240. In this way, for future communications with correspondent B, the recipient cache can be referenced at 242 to determine the cryptographic protocol capabilities 66 associated with correspondent B. An example future communication is shown in FIG. 7B.

Figure 7B:
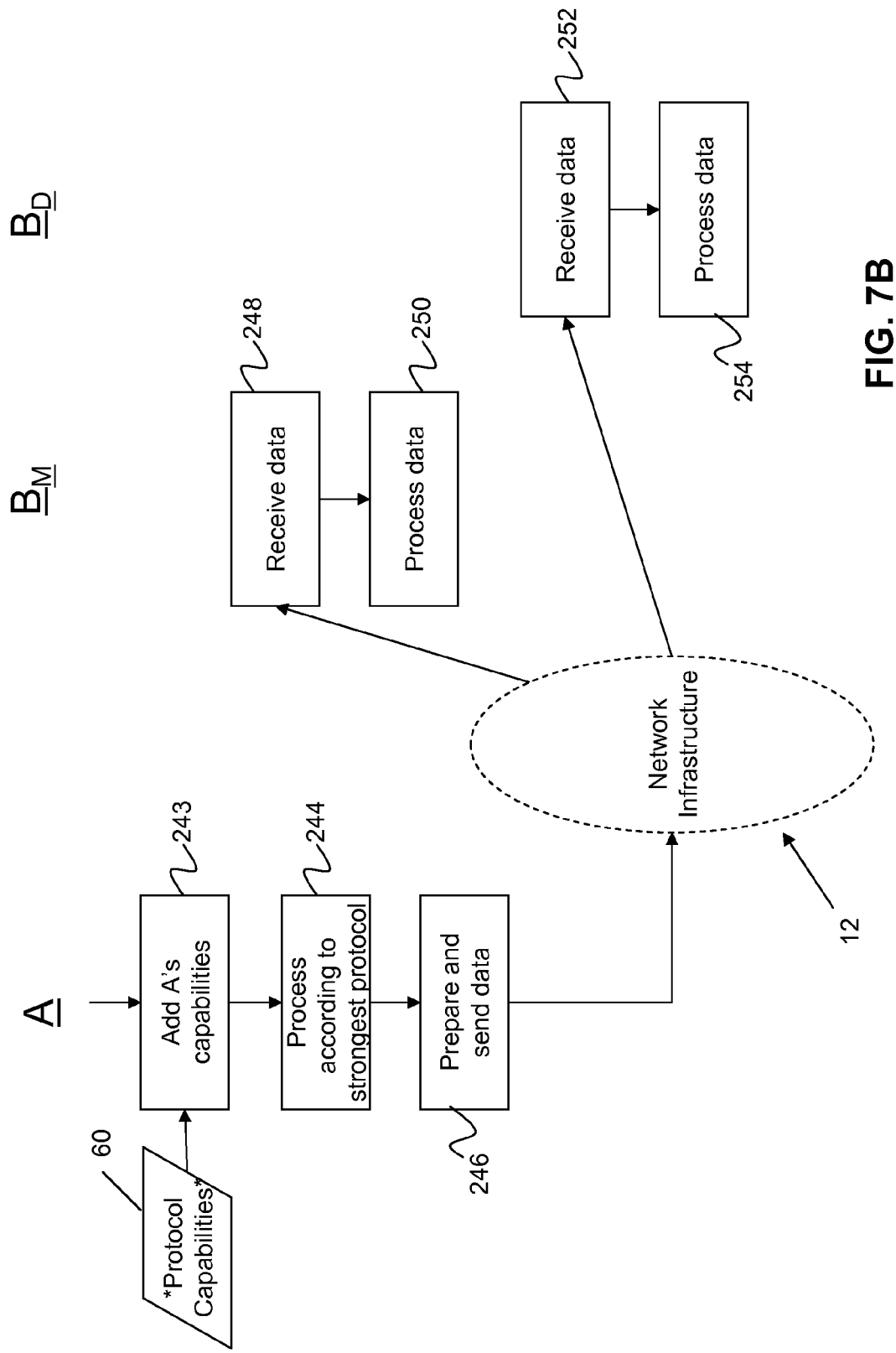
FIG. 7B is a flow diagram illustrating computer executable instructions continuing from the operations shown in FIG. 7A.

In FIG. 7B, it is assumed that correspondent A has obtained the capabilities of correspondent B (e.g. by performing operation 242). Correspondent A may then determine its own protocol capabilities 66 at 243, and the data 16 to be sent to correspondent B processed at 244 according to the strongest of the protocols determined in operation 242. The data 16 may then be prepared and sent at 246 via the network infrastructure 12. As explained above, the correspondent B in this example has a mobile device 10B and desktop computer 64B associated therewith, and thus the network infrastructure 12, e.g. using the wireless router 26, delivers the data 16 to both the mobile device 10B and the desktop computer 64B. The mobile device 10B would then receive the data 16 at 248 and process the data 16 accordingly at 250. Similarly, the desktop computer 64B, via a mail client 62, would receive the data 16 at 252 and process the data 16 accordingly at 254.

It can be appreciated that since correspondent A had prior knowledge of the capabilities of both entities associated with correspondent B, the data 16 being sent has been cryptographically processed with the strongest protocol that also permits both entities to process the data 16. Without this knowledge, either one or the other entity may be unable to process the data 16 (i.e. if an unsupported protocol is used), or a default protocol would be used, which may not be as strong.

Figure 8:
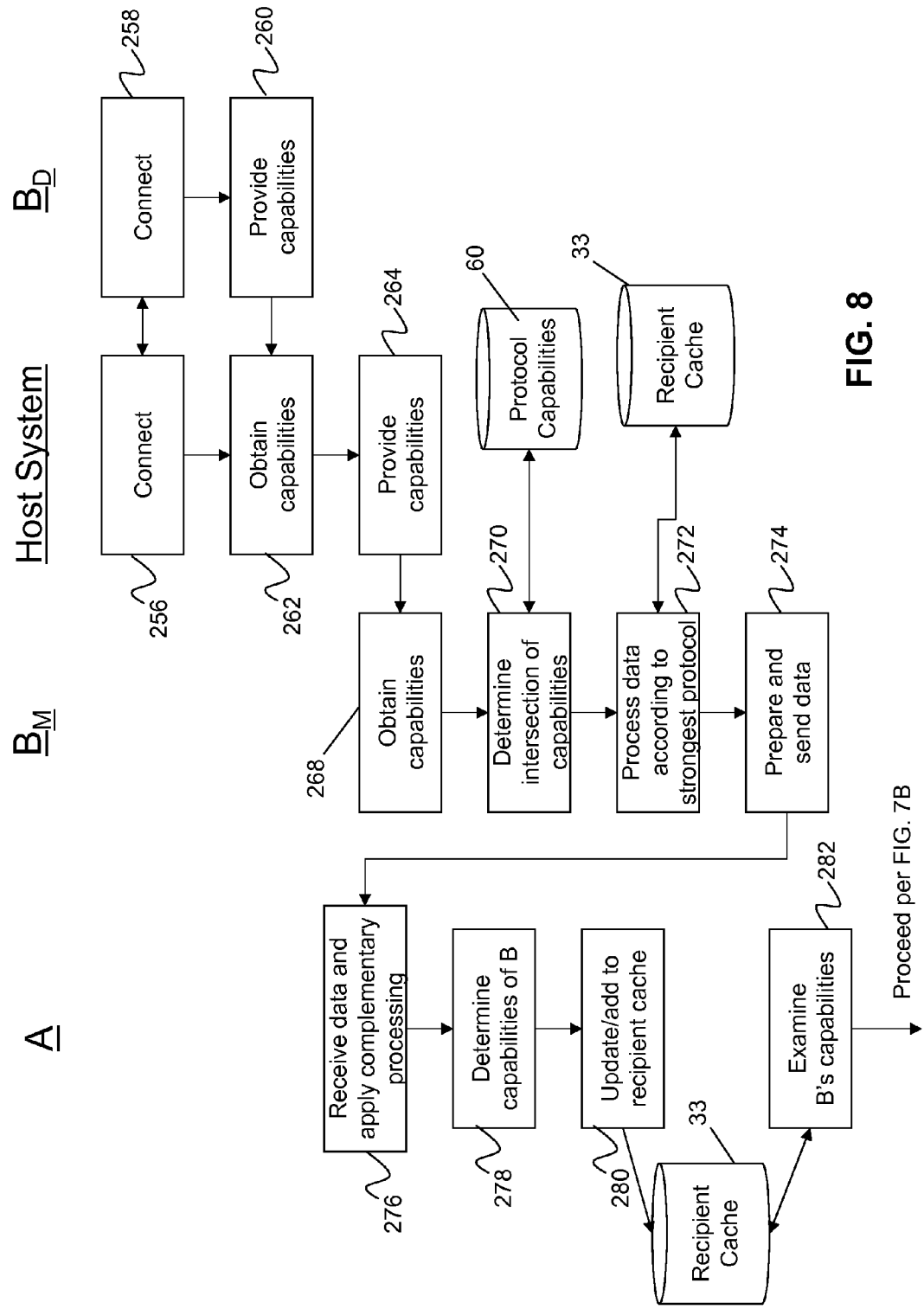
FIG. 8 is a flow diagram illustrating another example set of computer executable instructions for exchanging cryptographic protocol capabilities using the data structure shown in FIG. 5A.

Turning now to FIG. 8, another embodiment for enabling a correspondent to obtain the protocol capabilities for its related entities is shown. In the embodiment shown in FIG. 8, it is assumed that a host system 25 exists which is accessible to both the mobile device 10B and desktop computer 64B. At 256 and 258, the host system 25 connects to the desktop computer 64B in order to obtain the desktop computer's protocol capabilities at 262, which were made available by the desktop computer 64B at 260. The host system 25 is then able to provide the protocol capabilities for the desktop computer 64B at 264 to the mobile device 10B, who obtains them at 268. It can be appreciated that operations 256 to 268 can be performed at any appropriate time. For example, the host system 25 can obtain the protocol capabilities for the desktop computer 64B at some predetermined time and later provide these capabilities to the mobile device 10B, e.g. when an appropriate connection exists. The remaining operations shown in FIG. 8 are provided to illustrate what the mobile device 10B is capable of doing thereafter and such operations do not necessarily need to be performed immediately after operation 268.

Once the mobile device 10B obtains the capabilities of its associated desktop computer 64B at 268, it may then determine the intersection of those capabilities and its own protocol capabilities 66 at 270 and update the protocol capabilities module 60 accordingly. It will be appreciated that the determination made at 270 does not need to be done prior to storing the capabilities of the desktop computer 64B and this operation is shown for illustrative purposes only. Alternatively, the cryptographic module 53 of the mobile device 10B may determine the intersection at some later time based on all information it has available to it. The mobile device 10B may then process the data 16 according to the strongest protocol supported by correspondent A (if known) at 272 by referencing the recipient cache 33. Again, as noted above, if the mobile device 10B has never received a communication from correspondent A or otherwise does not know which protocols are supported by the entities associated with correspondent A, they can use a default protocol. The data 16 is then prepared and sent to correspondent A at 274.

Correspondent A may then receive the data 16 and apply the complementary cryptographic processing at 276 and, since mobile device 10B has included the protocol capabilities of itself and the desktop computer 64B, correspondent A can determine the capabilities of correspondent B at 278. Using this information, correspondent A can update/add an indication of the protocol capabilities for correspondent B (e.g. intersection of protocols supported by both mobile device 10B and desktop computer 64B) to the recipient cache 33 at 280. In this way, for a future communication, correspondent A can examine the recipient cache 33 to determine correspondent B's capabilities at 282 and proceed in a manner similar to the operations shown in FIG. 7B.

In FIG. 8, it can be seen that for the mobile device 10B to ascertain the capabilities of its related entity desktop computer 64B, an intermediary such as the host system 25 can be used to "reach in" or otherwise determine the capabilities on its behalf. In another embodiment, an intermediary such as the host system 25 can also be used to determine the capabilities of other entities associated with a particular correspondent and provide the information obtained to any applicable entity. An example of an embodiment using this configuration is shown in FIG. 9.

Figure 9:
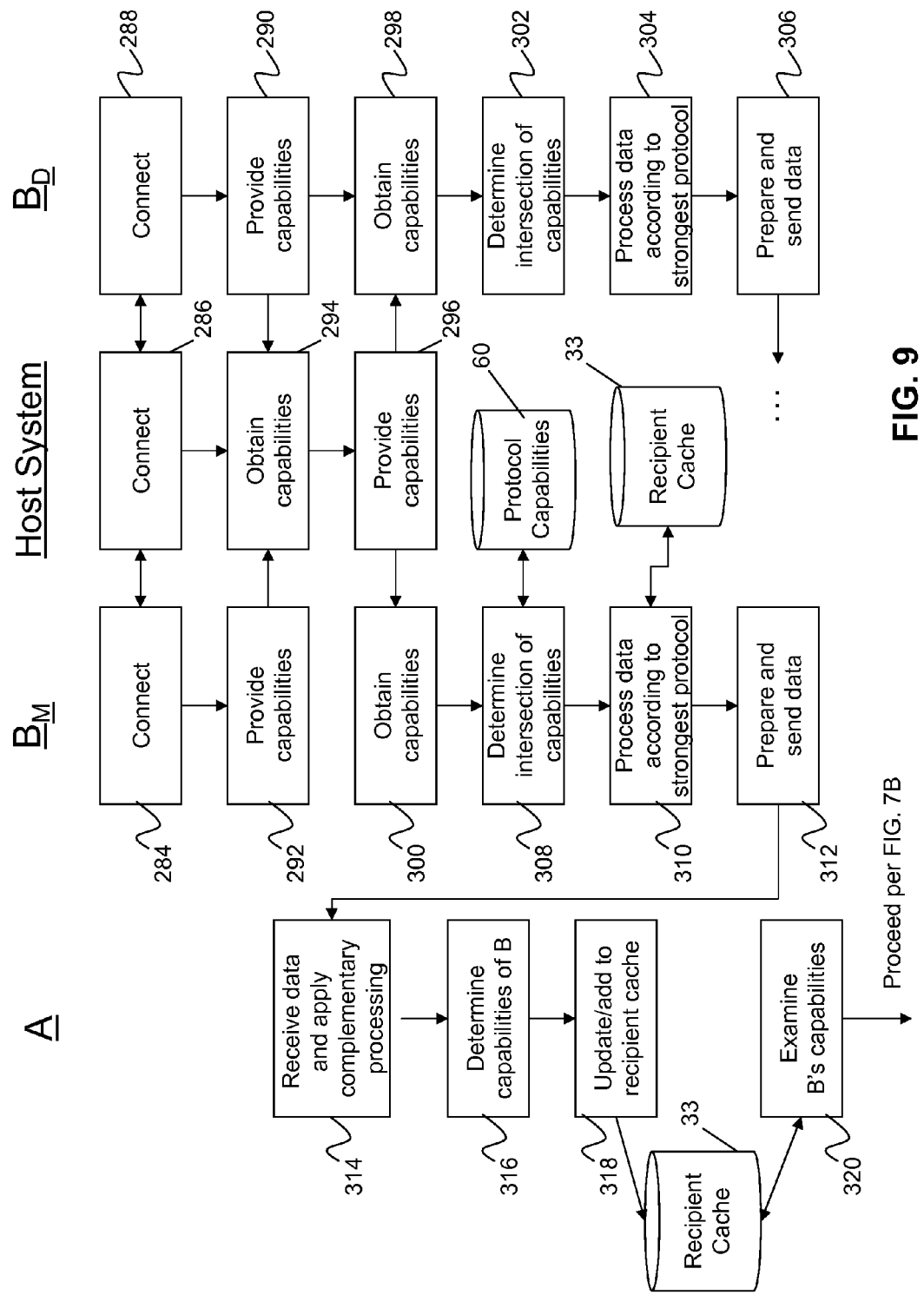
FIG. 9 is a flow diagram illustrating yet another example set of computer executable instructions for exchanging cryptographic protocol capabilities using the data structure shown in FIG. 5A.

In FIG. 9, the host system 25 provides an opportunity for the mobile device 10B and desktop computer 64B to connect thereto at 284, 286 and 288. By enabling the mobile device 10B and the desktop computer 64 to provide information indicative of their protocol capabilities at 292 and 290 respectively, the host system 250 can obtain current protocol capabilities at 294. The host system 25 may then provide up-to-date information at 296 to enable both the mobile device 10B and desktop computer 64B to access and obtain the protocol capabilities for the other entity at 300 and 298 respectively. By sharing the protocol capabilities amongst all entities as shown in FIG. 9, the protocol capabilities associated with correspondent B in general will be distributed regardless of which mail client 62 and thus platform is used. As can be seen, the desktop computer 64B may then determine the intersection of its capabilities at 302 and for a future communication use this information and information it may have (not shown) regarding the recipient (e.g. correspondent A) to process data according to the strongest protocol supported by the recipient and include details of the protocols supported by correspondent B at 304. Then, data 16 prepared and sent at 306 would include the same information that the mobile device 10B was able to provide in the example shown in FIG. 8 but from a desktop-based mail client 62.

Similarly, the mobile device 10B can also determine the intersection of correspondent B's capabilities to update its protocol capabilities module 60, and can process data according the strongest protocol supported by correspondent A at 310 by accessing its recipient cache 33 and the data 16 prepared and sent at 312 as above. Similar to FIG. 8, it can be seen that the data 16 sent by mobile device 10B is received and complementary processing applied at 314; the capabilities of correspondent B determined at 316; the recipient cache 33 updated at 318; in future communications, correspondent B's protocol capabilities determined at 320; and the process may proceed in a manner similar to that shown in FIG. 7B. It can be appreciated that any data 16 sent by desktop computer 64B can be processed by correspondent A according to operations 314 to 320. It can also be appreciated that the operations performed by the mobile device 10B and desktop computer 64B need not be performed at the same time and are shown side-by-side for illustrative purposes only.

In another embodiment (not shown), a trusted service can be utilized to extract all the capabilities from all recipients and then query them at any time or perform a synchronization with contacts known to the particular recipient, e.g. from a locally stored address book.

Figure 10:
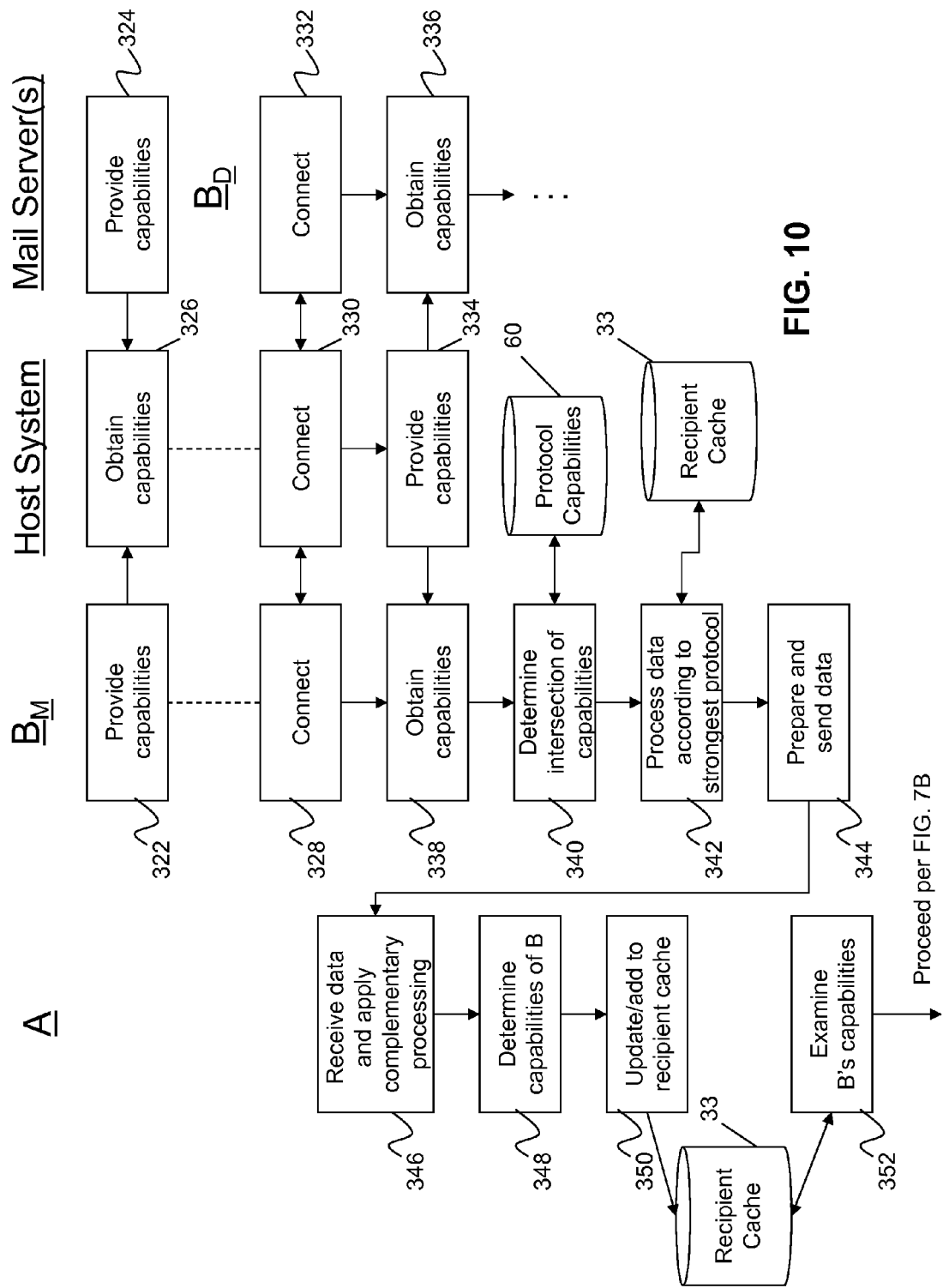
FIG. 10 is a flow diagram illustrating yet another example set of computer executable instructions for exchanging cryptographic protocol capabilities using the data structure shown in FIG. 5A.

In the embodiment shown in FIG. 9, an intermediary such as the host system 25 is used to "reach into" each entity in order to provide, to each entity, the capabilities of the other entities. A variation of this embodiment is shown in FIG. 10, wherein the host system 25 acts as an intermediary to post or publish protocol capabilities provided by each entity, e.g. by the mobile device 10B and the mail servers 62 associated with the desktop computer 64B. In this way, a central service or access point can maintain up-to-date information to avoid having the entities themselves maintain such information if it changes over time.

Turning now to FIG. 10, the mail servers 62 and mobile device 10B can, at some point in time (e.g. on demand, periodically, etc.) provide their protocol capabilities to the host system 25 at 324 and 322 respectively to thereby enable the host system 25 to gather or obtain the protocol capabilities associated with the entities associated with correspondent A at 326. It can be appreciated that the operations 322, 324, and 326 can be performed at any suitable time. Since the host system 25 is assumed to have up-to-date information regarding correspondent B, any entity associated with correspondent B can access the host system 25 by connecting thereto at 328, 330, and 332 to obtain capabilities (336, 338) provided by the host system at 334. The remaining operations (340 to 352) shown in FIG. 10 are similar to operations 308 to 320 of FIG. 9. It may also be noted that the desktop computer 64B may proceed in the same manner as shown in FIG. 9, including operations 302 to 306 which have been left out of FIG. 10 for brevity.

It may be noted that the host system 25 may have the ability to 'push' capabilities to one or more of the correspondents when they change. In other words, the particular correspondent may not need to be configured to initiate the connection: the host system 25 may be capable of initiating the connection (remotely, over-the-air, etc). Such a configuration is particularly advantageous if, for example, one changes the capabilities of their desktop client and their device can find out automatically without the user having to "plug it in" to the host system 25.

The embodiments shown in FIGS. 6 to 10 provide various mechanisms for the sender to predetermine or otherwise assume the responsibility for determining the capabilities of all its entities. By obtaining the protocol capabilities of related entities, a correspondent can ensure that in future communications from the recipient, an appropriate protocol will be used that is supported by all the entities. Also, this can avoid having such future communications cryptographically processed by the default protocols which may not be as strong as what could have been used.

However, it has been recognized that instead of requiring the sender to know the capabilities of the related entities, in other embodiments, the data structure 16' shown in FIG. 5B can be used to enable the recipient to gather information from entities as data 16' is received separately from these entities, to thereafter collate this information to build an overall profile of the sending correspondent for future communications.

Figure 11:
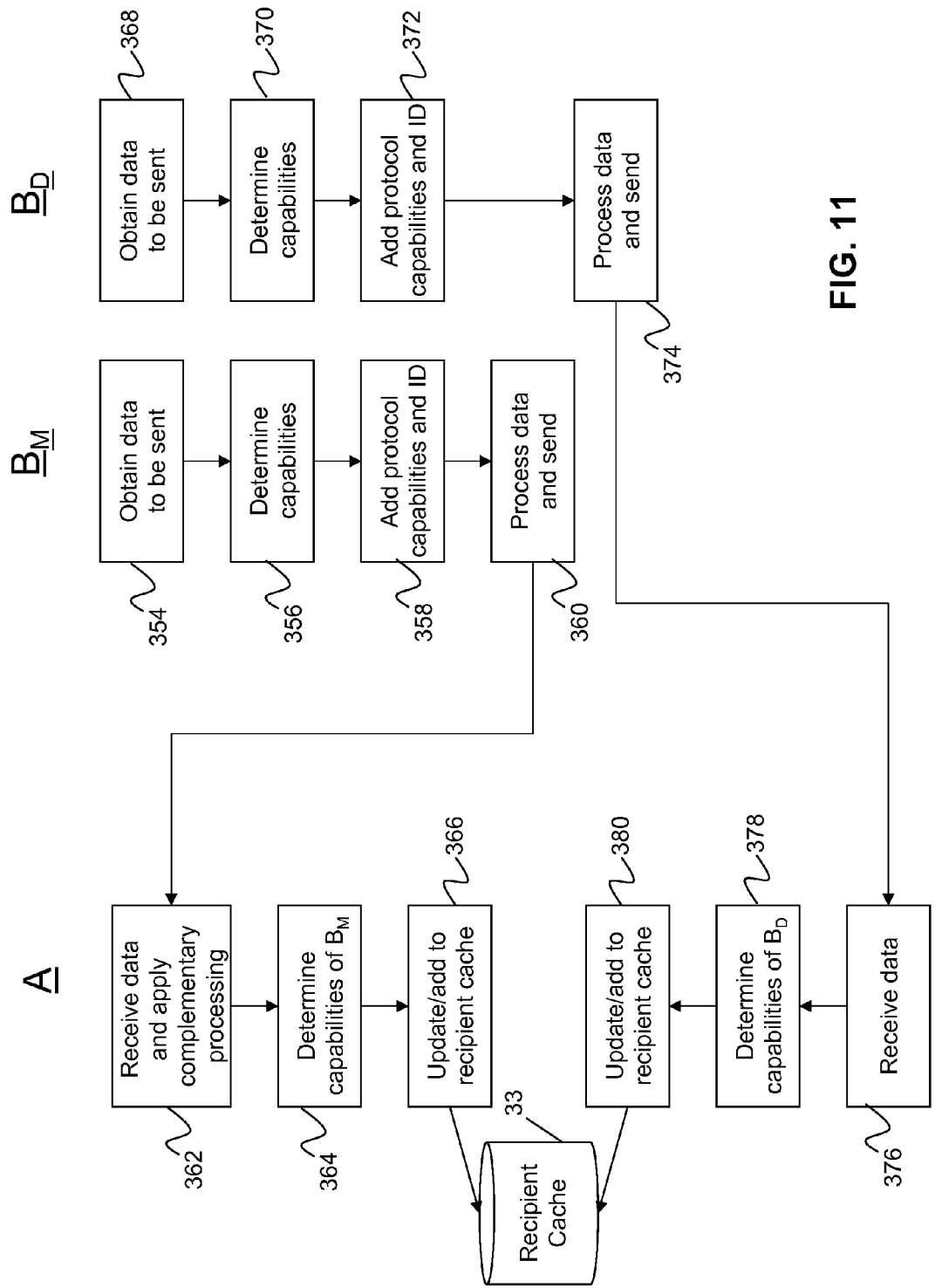
FIG. 11 is a flow diagram illustrating an example set of computer executable instructions for obtaining cryptographic protocol capabilities using the data structure shown in FIG. 5B.

Turning now to FIG. 11, an embodiment using the data structure 16' shown in FIG. 5B is provided. As can be seen in FIG. 11, the mobile device 10B and desktop computer 64B independently provide information indicative of their own capabilities. At 354, mobile device 10B obtains data 16 to be sent, determines its protocol capabilities 66 at 356, adds its protocol capabilities 66 and ID 68 at 358, and processes and sends data 16' at 360. Similarly, for a communication sent from desktop computer 64B, the data 16 to be sent may be obtained at 368, the desktop computer's protocol capabilities determined at 370, their own protocol capabilities 66 and ID 68 added at 372, and data 16' sent at 374.

The recipient, in this example, an entity associated with correspondent A would independently receive the data 16' sent by respective entities for correspondent B. In this case, correspondent A would receive the data 16' from mobile device 10B as indicated by the ID 68 and apply complementary cryptographic processing at 362, determine the capabilities of the mobile device 10B at 364, and update or add this information to the recipient cache 33 at 366. When receiving a communication from the desktop computer 64B at 376 as indicated by the ID 68, correspondent A would determine the capabilities of the desktop computer 64B at 378 and update or add this information to the recipient cache 33 at 380. In this way, correspondent A can use the ID 68 to determine that it is receiving the protocol capabilities from a particular entity associated with correspondent B and can identify this information in the recipient cache 33 for later use in future communications from correspondent A to correspondent B.

Figure 12:
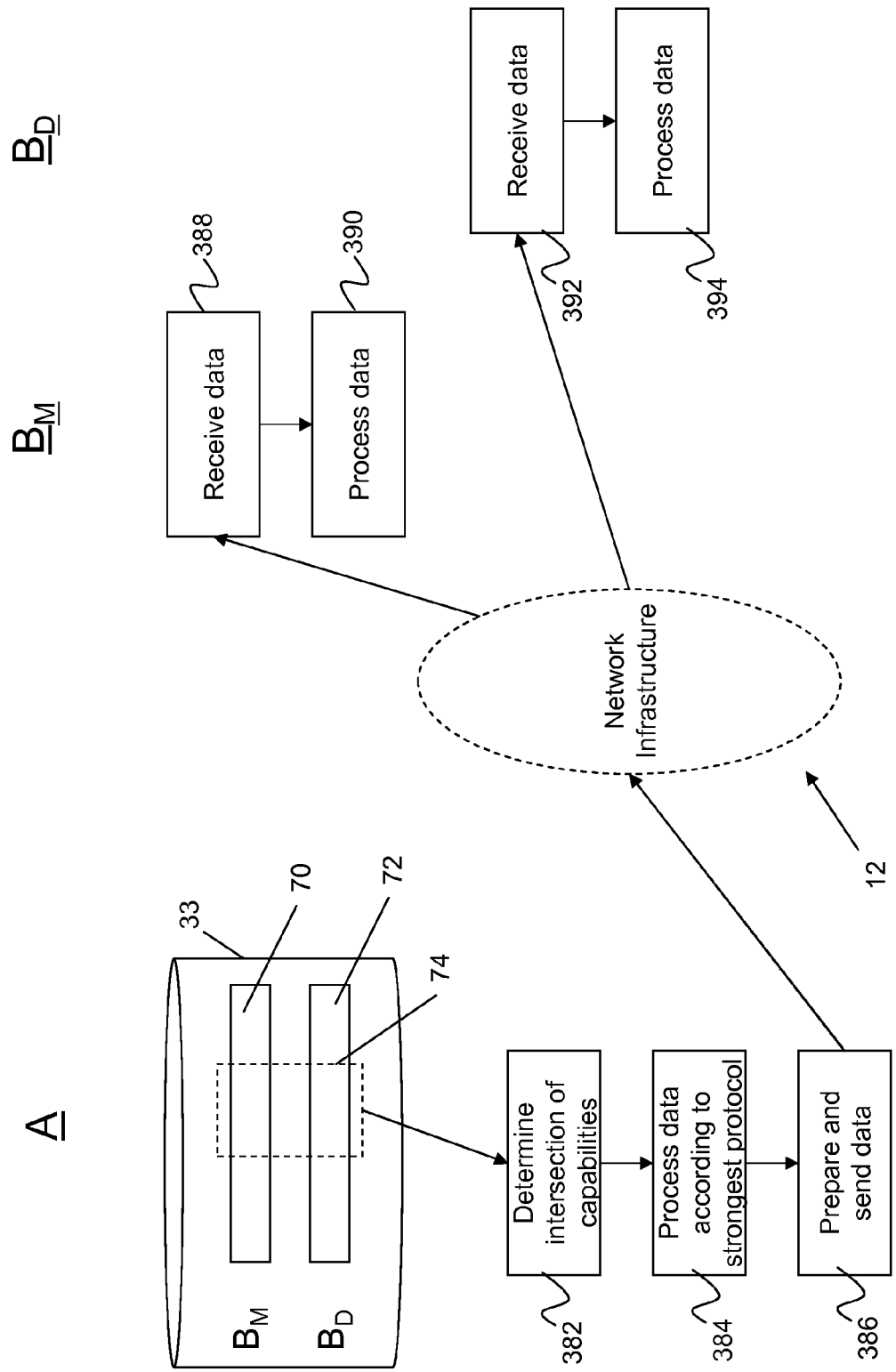
FIG. 12 is a flow diagram is a flow diagram illustrating an example set of computer executable instructions for utilizing the cryptographic protocol capabilities obtained according to FIG. 11.

FIG. 12 provides an example future communication from correspondent A to correspondent B. Since correspondent A had gathered information pertaining to both entities associated with correspondent B—i.e. in FIG. 11 in this example, the recipient cache 33 may include a first entry 70 related to the mobile device 10B and a second entry 72 related to the desktop computer 64B. The entries 70 and 72 can be compared at 382 to determine the intersection of the capabilities 74 of both entities such that data 16 to be sent to correspondent B is processed according to a protocol that is supported by both the mobile device 10B and the desktop computer 64B at 384. It can be appreciated that the use of a pair of entries 70, 72 is shown for illustrative purposes and in other embodiments, correspondent A may store only the intersection of the capabilities 74 and update this information if capabilities change. Data 16 may then be prepared and sent to correspondent B at 386 which, in this example would be sent via the network infrastructure 12 and thus be available to both the mobile device 10B and the desktop computer 64B. Since a protocol supported by both entities is used by correspondent A, mobile device 10B is able to receive the data 16 at 388 and process the data 16 at 390. Similarly, the desktop computer 64B is able to receive the data 16 at 392 and process the data 16 at 394.

Although the above principles have been described with reference to certain specific embodiments, various modifications thereof will be apparent to those skilled in the art without departing from the scope of the claims appended hereto.

The invention claimed is:

1. A method for providing cryptographic protocol capabilities, the method comprising:
   a sending device operated by a first correspondent in a data communication system determining a first set of protocol capabilities corresponding to its local cryptographic protocol capabilities;
   the sending device obtaining at least one additional set of protocols corresponding to at least one other device operated by the first correspondent, at least one of the first and second sets of protocol capabilities being obtained by communicably connecting the sending device to an intermediate server; and
   the sending device preparing data to be sent to a recipient device operated by a recipient correspondent in the data communication system, and including in the data, an indication of protocols supported by the sending device and the at least one other device to thereby indicate to the recipient correspondent, one or more protocols that can be handled by both the sending device and the at least one other device when the recipient device communicates with any of the sending device and the at least one other device operated by the first correspondent.

2. The method according to claim 1, wherein the indication of protocols comprises only protocols supported by both the sending device and the at least one other device.

3. The method according to claim 1, wherein the second set of protocol capabilities is obtained by the intermediate server connecting to the at least one other device.

4. The method according to claim 1, wherein the intermediate server is accessible to both the sending device and the at least one other device.

5. The method according to claim 1, wherein the intermediate server is configured to push at least the second set of protocol capabilities to the sending device, the method further comprising the sending device receiving the second set of protocol capabilities from the intermediate server.

6. The method according to claim 1, further comprising:
   the sending device referencing a recipient cache to determine one or more protocols supported by each of one or more entities associated with the recipient; and
   cryptographically processing the data according to a desired one of the one or more protocols to thereby utilize a protocol supported by all of the one or more entities associated with the recipient.

7. A non-transitory computer readable storage medium for providing cryptographic protocol capabilities, the computer readable storage medium comprising instructions for:
   a sending device operated by a first correspondent in a data communication system determining a first set of protocol capabilities corresponding to its local cryptographic protocol capabilities;
   the sending device obtaining at least one additional set of protocols corresponding to at least one other device operated by the first correspondent, at least one of the first and second sets of protocol capabilities being obtained by communicably connecting the sending device to an intermediate server; and
   the sending device preparing data to be sent to a recipient device operated by a recipient correspondent in the data communication system, and including in the data, an indication of protocols supported by the sending device and the at least one other device to thereby indicate to the recipient correspondent, one or more protocols that can be handled by both the sending device and the at least one other device when the recipient device communicates with any of the sending device and the at least one other device operated by the first correspondent.

8. The non-transitory computer readable storage medium according to claim 7, wherein the indication of protocols comprises only protocols supported by both the sending device and the at least one other device.

9. The non-transitory computer readable storage medium according to claim 7, wherein the second set of protocol capabilities is obtained by the intermediate server connecting to the at least one other device.

10. The non-transitory computer readable storage medium according to claim 7, wherein the intermediate server is accessible to both the sending device and the at least one other device.

11. The non-transitory computer readable storage medium according to claim 10, wherein the intermediate server is configured to push at least the second set of protocol capabilities to the sending device, the instructions further comprising the sending device receiving the second set of protocol capabilities from the intermediate server.

12. The non-transitory computer readable storage medium according to claim 7, further comprising instructions for:
   referencing a recipient cache to determine one or more protocols supported by each of one or more entities associated with the recipient; and
   cryptographically processing the data according to a desired one of the one or more protocols to thereby utilize a protocol supported by all of the one or more entities associated with the recipient.

13. A method for obtaining cryptographic protocol capabilities for a plurality of devices operated by a sender correspondent in a data communication system, the method comprising:
- a recipient device receiving data from the sender correspondent, a portion of the data comprising a set of protocols for a plurality of devices operated by the sender correspondent, at least one of the set of protocols having been obtained by a sending device of the sender correspondent communicably connecting the sending device to an intermediate server and obtaining the at least one protocol via the connection;
- the recipient device storing at least one of the set of protocols in a recipient cache;
- in a future communication with any of the plurality of devices operated by the sender correspondent, the recipient device referencing the recipient cache in selecting a protocol supported by each of the plurality of devices; and
- the recipient device cryptographically processing data to be sent to any of the plurality of devices operated by the sender correspondent according to the selected protocol to enable the plurality of devices to cryptographically process the data accordingly.

14. The method according to claim 13, wherein all of the sets of protocols are received by the sending device from the intermediate server.

15. The method according to claim 13, wherein the set of protocols stored in the recipient cache is the at least one protocol supported by all of the plurality of devices.

16. A recipient device capable of communicating with at least any of a plurality of devices operated by a sender correspondent using cryptographic protocol capabilities in a data communication system, the recipient device comprising:
- memory for storing instructions; and
- a processor coupled with the memory and responsive to executing the instructions, for performing a method comprising:
- the recipient device receiving data from any of a plurality of devices operated by a sender correspondent, a portion of the data comprising a set of protocols for the plurality of devices operated by the sender correspondent, at least one of the set of protocols having been obtained by a sending device of the sender correspondent communicably connecting the sending device to at least one other of the plurality of devices and obtaining the at least one protocol via the connection;
- the recipient device storing at least one of the set of protocols in a recipient cache;
- in a future communication with any of the plurality of devices operated by the sender correspondent, the recipient device referencing the recipient cache in selecting a protocol supported by each of the plurality of devices; and
- the recipient device cryptographically processing data to be sent to any of the plurality of devices operated by the sender correspondent according to the selected protocol to enable the plurality of devices to cryptographically process the data accordingly.

17. The recipient device according to claim 16, wherein the set of protocols is received in separate messages sent by each of the plurality of devices.

18. The recipient device according to claim 16, wherein the set of protocols stored in the recipient cache is the at least one protocol supported by all of the plurality of devices.

* * * * *